Dec. 23, 1941.  J. VERNER  2,267,057

VALVE

Filed Nov. 20, 1940

INVENTOR
Jules Verner
BY
Alan M. Mann
his ATTORNEY

Patented Dec. 23, 1941

2,267,057

UNITED STATES PATENT OFFICE 2,267,057

VALVE

Jules Verner, Linden, N. J.

Application November 20, 1940, Serial No. 366,319

3 Claims. (Cl. 251—39)

This application relates to valves of the type ordinarily used in relatively large lines to control industrial production or the flow of water or the like. In other words, it is intended for the same type of service where gate valves are frequently employed.

Broadly speaking, my valve comprises an enlarged chamber having an opening at each end equal to the inside diameter of the line. One end is free and the other end contains a circular valve seat. Ordinarily, the valve will be positioned so that the end containing the seat is the inlet end and the other is the outlet. Positioned in the enlarged chamber and supported by guides running to the sides of the chamber is a movable plug member preferably streamlined into tear drop form with the round or blunt end toward the valve seat. The guides for this plug member maintain it in an approximately uniform axial position to permit longitudinal movement and permit slight transverse movement so that the plug can seat itself accurately on the valve seat.

The movement of the plug member is controlled by a shaft which enters the enlarged chamber through a stuffing box and ordinarily will be seated in a closed bearing at its other end. This shaft passes through the movable member and carries an eccentric cam. This cam is so arranged that it will move the plug positively back and forth to and from the valve seat and when the plug is seated on the valve seat, the cam will be almost in its extreme dead-center position. This means that when the cam is in this position, it will be exerting a maximum force to close the valve and at the same time the thrust of the line pressure against the movable member will be almost a direct thrust against the cam so that there will be little or no tendency for the line pressure to open the valve. This leverage effect and resistance against displacement can further be increased by operating the shaft through the medium of a worm gear. Ordinarily the shaft and the side supports for the movable member will be in alignment. It is also an important feature of my invention that the cooperating seating surfaces of the plug and casing are removable without removing the plug from the casing.

Figure 1:
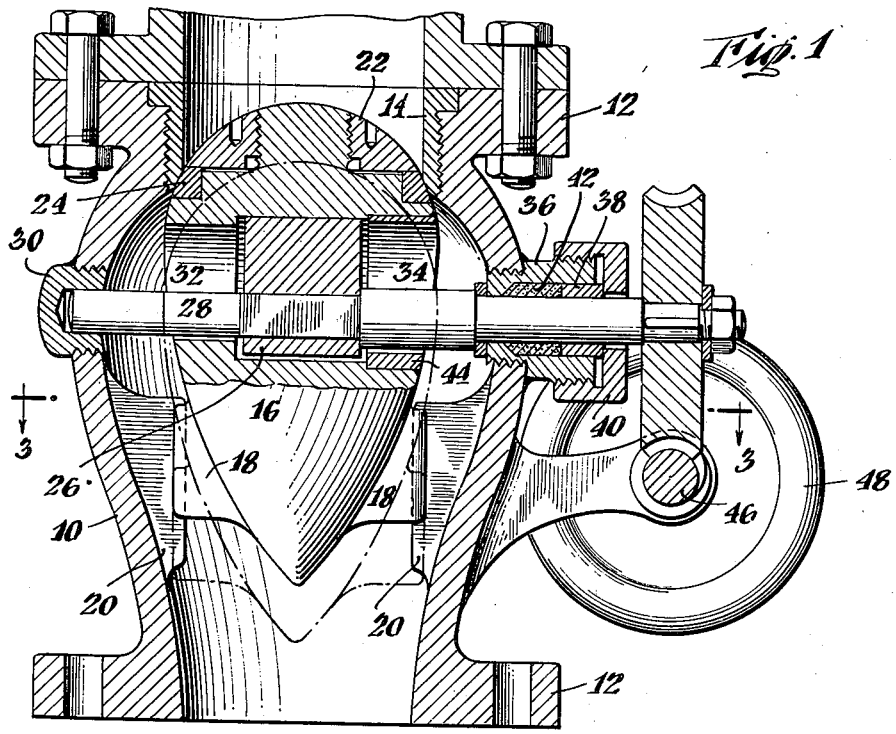
Figures 2, 3:
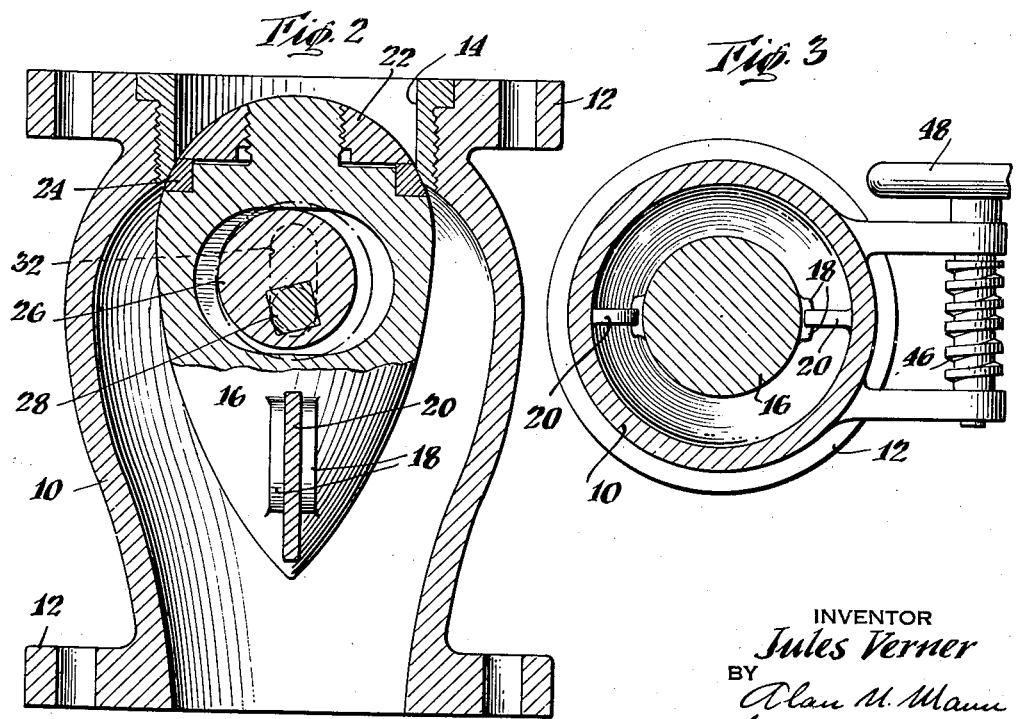

The exact nature of this invention can readily be understood by reference to the accompanying drawing in which Fig. 1 is a longitudinal section through a valve embodying my invention; Fig. 2 is a longitudinal section taken at right angles to the section shown in Fig. 1 and Fig. 3 is a transverse section taken on line 3—3 of Fig. 1 and shown on a slightly reduced scale.

In the drawing, the numeral 10 designates the main valve casing which is circular in shape and of a relatively simple contour so that it can be forged of steel, if desired. This casing 10 is here illustrated as provided with flanges 12 for attachment to adjacent sections of pipe as shown in Fig. 1.

At one end the casing 10 is recessed and threaded to receive a removable valve seat 14. When this valve seat 14 is removed a clear opening into the interior of the casing 10 is provided large enough to receive the plug 16. The plug 16 has a spherical nose portion and at its opposite end it is preferably streamlined or given a tapered or tear drop shape. At the tapered end the plug 16 is provided with two pairs of guide members 18, and the casing 10 is provided with two guide flanges 20 which cooperate with the guide members 18 to hold the plug 16 so that it can move along the line of the axis of the valve without any great amount of rotation and yet still have sufficient freedom to move transversely so that it can seat accurately. The plug 16 preferably has a removable nose portion 22 which locks in place a contact ring 24 which contacts with the removable seating member 14. By this construction by first removing member 14 and then removing members 22 and 24, both of the seating members are easily removable for replacement or re-grinding.

The plug 16 is moved longitudinally in the casing 10 by an internal cam 26 mounted on a shaft 28. The shaft 28 is here shown as having a longitudinal end portion which rotates in a bearing 30 welded into the side of the casing 10, and as having a central squared portion which fits inside the cam 26 and a slightly larger cylindrical portion which extends out of the plug 16. Longitudinal slots 32 and 34 are formed in the sides of the plug 16. A bearing 36 is provided with a gland 38 and a locking ring 40 which operates on packing 42 to prevent leakage around the end of the shaft 28 which extends out of the valve casing.

In order to insert the cam 26 into the plug 16, a cylindrical opening is formed in one side of the plug which receives a side member 44 in which is formed the slot 34. When the cam 26 has been inserted in the plug 16 the member 44 is forced in and preferably welded in place.

The opening for the cam 26 should be so shaped that the cam will move freely at the sides, and it may be so shaped as to permit the cam full movement at the tapered end after moving the plug to retracted position. However, in order that the valve may be closed tightly, the opening at the nose end should be such that the cam member 26 cannot quite reach dead center. In Fig. 2 the parts are shown with the plug 16 fully seated and the cam 26 still 15 degrees from the dead center position.

While this 15-degree offset is close enough to dead center so that ordinarily the plug would be wedged fixedly in place by the cam in this position, any danger of having the valve open under pressure is eliminated by having the shaft 28 operated through the irreversible worm gears 46 which in turn may be driven by a hand wheel 48.

It will be noted that with this construction the fluid passing through the valve will flow smoothly around the streamlined plug 16 and the only interruptions to its flow are the shaft 28 and the guide flanges 18 and 20. These flanges are preferably aligned with the shaft and therefore give a minimum of obstruction.

By employing the internal cam coupled with the guide flanges, the plug is free to seat itself accurately in the valve on closing and the mechanics of its operation are exceedingly simple. The only opening into the valve chamber from outside the line is the single opening for the shaft 28, and this can readily be kept tight by the use of the usual packing.

It is understood that the example shown is given only by way of illustration, and the same may be modified in many particulars without departing from the spirit of my invention.

What I claim is:

1. In a valve of the type described, the combination of a plug of approximately tear-drop shape having a contact portion at its blunt end adjacent to but not including the zone of maximum diameter of the plug and having guide members at the tapered end so arranged as not substantially to increase the overall diameter of the plug, a unitary casing with a streamlined interior which leads from an enlarged zone to restricted openings at the ends of the casing, one of said openings being large enough to receive the plug, guide members in the casing to cooperate with the guide members of the plug, a removable seating member adapted to be held in said plug receiving opening, having walls of a thickness approximately to cover the contact portion of the plug and cam means comprising a shaft passing through the casing wall for moving said plug longitudinally.

2. A structure as specified in claim 1 in which the cam mechanism is substantially enclosed within the plug to eliminate undue eddy currents in the fluid passing through the valve.

3. A structure as specified in claim 1 in which the cooperating guides and the operating shaft are aligned to provide a minimum of interference with the flow of fluid through the valve.

JULES VERNER.